(12) United States Patent
Lien et al.

(10) Patent No.: US 6,493,050 B1
(45) Date of Patent: Dec. 10, 2002

(54) WIDE VIEWING ANGLE LIQUID CRYSTAL WITH RIDGE/SLIT PRETILT, POST SPACER AND DAM STRUCTURES AND METHOD FOR FABRICATING SAME

(75) Inventors: Shui-Chih A. Lien, Briarcliff Manor, NY (US); Shuhichi Odahara, Atsugi (JP); Yukito Saitoh, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/426,502

(22) Filed: Oct. 26, 1999

(51) Int. Cl.[7] ............... G02F 1/1335; G02F 1/1337; G02F 1/1339
(52) U.S. Cl. ............... 349/106; 349/129; 349/153; 349/156
(58) Field of Search ............... 349/106, 156, 349/153, 155, 129, 130

(56) References Cited

U.S. PATENT DOCUMENTS

| | | | |
|---|---|---|---|
| 5,680,187 A | * 10/1997 | Nagayama et al. | 349/110 |
| 5,748,266 A | * 5/1998 | Kodate | 349/39 |
| 5,757,451 A | * 5/1998 | Miyazaki et al. | 349/106 |
| 5,815,232 A | * 9/1998 | Miyazaki et al. | 349/155 |
| 5,831,710 A | 11/1998 | Colgan et al. | |
| 5,907,380 A | 5/1999 | Lien | |
| 6,010,384 A | * 1/2000 | Nishino et al. | 448/24 |
| 6,256,080 B1 | * 7/2001 | Colgan et al. | 349/129 |
| 6,281,960 B1 | * 8/2001 | Kishimoto et al. | 349/156 |

OTHER PUBLICATIONS

Takeda et al., "41.1: A Super–High–Image–Quality Multi-Domain Vertical Alignment LCD by New Rubbing–Less Technology", May 1998, SID '98 Digest, pp. 1077–1080.*

* cited by examiner

*Primary Examiner*—Toaan Ton
*Assistant Examiner*—Andrew Schechter
(74) *Attorney, Agent, or Firm*—F. Chau & Associates, LLP

(57) ABSTRACT

A method for forming functional structures for a liquid crystal display, in accordance with the present invention includes providing a substrate and patterning a first color filter layer on the substrate. A second color filter layer is patterned on the first color filter layer and the substrate such that the first color filter layer and the second color filter layer overlap at predetermined locations. A third color filter layer is patterned on the second color filter layer and the substrate such that an overlap region exists between the first, second and third color filter layers at the predetermined locations. The overlap region includes a thickness of the first, second and third color filter layers. A dielectric layer is provided to form the functional structures.

25 Claims, 10 Drawing Sheets

WIDE VIEWING ANGLE LIQUID CRYSTAL WITH RIDGE/SLIT PRETILT, POST SPACER AND DAM STRUCTURES AND METHOD FOR FABRICATING SAME

BACKGROUND OF THE INVENTION

1. Field of the Invention

The present invention relates to liquid crystal displays, and more particularly to a display structure which provides improved performance and a method for fabricating pretilt structures, spacers and dams in a single lithographic step.

2. Description of the Related Art

Liquid crystal displays (LCD) are an important component for notebook or laptop computers. Lightweight and cost effective LCDs have enabled these portable computers to be cost effective and reliable digital tools. LCDs have even penetrated the desktop market. Therefore, improvement of LCD performance is strongly desirable.

Contrary to the desire to improve performance, approaches to improve the display performance usually increase the manufacturing cost. It should be understood that the fabrication cost of an active matrix LCD (AMLCD) is approximately proportional to the number of photo lithographic steps needed. More complicated structures are often associated with performance improvements. These additional structures typically require additional photolithographic patterns and steps.

Therefore, a need exists for a structure and fabrication method which reduces photolithographic steps while improving LCD performance.

SUMMARY OF THE INVENTION

A method for forming functional structures for a liquid crystal display, in accordance with the present invention, includes the steps of providing a substrate, patterning a first color filter layer on the substrate, patterning a second color filter layer on the first color filter layer and the substrate such that the first color filter layer and the second color filter layer overlap at predetermined locations. A third color filter layer is patterned on the second color filter layer and the substrate such that an overlap region exists between the first, second and third color filter layers at the predetermined locations. The overlap region includes a thickness of the first, second and third color filter layers. A dielectric layer is patterned on the overlap region to form the functional structures.

In alternate methods, the predetermined locations may include a periphery of the display device and the step of patterning a dielectric layer on the overlap region to form the functional structures may include the step of patterning the dielectric layer to form dam structures on the overlap regions about the periphery of the display device. The predetermined locations may include areas between pixels in an array of pixels formed on the substrate of the display device, and the step of patterning a dielectric layer on the overlap region to form the functional structures may include the step of patterning the dielectric layer to form post spacers. The step of patterning a dielectric layer on the overlap region to form the functional structures may include the step of patterning pretilt structures on pixel electrodes formed on one of the first, second, and third color filter layers other than on the overlap region.

The step of patterning pretilt structures may include patterning at least one of trenches and ridges on the pixel electrodes. The step of patterning a dielectric layer on the overlap region to form the functional structures may include the step of concurrently forming dams, post spacers and pretilt structures by patterning the dielectric layer be employing a single lithographic process.

A method for forming dams, post spacers and pretilt structures in a single lithographic step for a liquid crystal display includes the steps of providing a first substrate and a second substrate. The second substrate has at least one electrode formed thereon. A first color filter layer is patterned on the first substrate. A second color filter layer is patterned on the first color filter layer and the first substrate such that the first color filter layer and the second color filter layer overlap at predetermined locations. A third color filter layer is patterned on the second color filter layer and the first substrate such that overlap regions exist between the first, second and third color filter layers at the predetermined locations. The overlap regions include a thickness of the first, second and third color filter layers. At least one electrode is formed on the first, the second and the third color filter layers of the first substrate other than on the overlap regions. A dielectric layer is formed on the overlap regions and the at least one electrode on the first substrate to concurrently form the dams, the spacer posts on the overlap regions and the pretilt structures on regions other than the overlap regions.

In other methods, the step of assembling the first substrate and the second substrate together such that the post spacers provide a gap distance between the at least one electrode on the first substrate and the at least one electrode on the second substrate is preferably included. The method may include the step of assembling the first substrate and the second substrate together such that the dams provide a seal to prevent leakage of liquid crystal material disposed between the first and second substrates. The step of patterning a dielectric layer on the overlap regions may include the step of patterning pretilt structures which include a ridge or a trench. The overlap region may include a thickness of about one half the gap distance. The dielectric layer may include a thickness of about one half the gap distance.

Another method for forming functional structures for a liquid crystal display includes the steps of providing a substrate, patterning a first color filter layer on the substrate, patterning a second color filter layer on the first color filter layer and the substrate such that the first color filter layer and the second color filter layer overlap at predetermined locations and patterning a third color filter layer on the second color filter layer and the substrate such that an overlap region exists between the first, second and third color filter layers at the predetermined locations. The overlap region includes a thickness of the first, second and third color filter layers which is equal to a cell gap distance for the liquid crystal display.

In other methods, the predetermined locations may include a periphery of the display device, and the step of forming dam structures about the periphery of the liquid crystal display from the overlap region may be included. The predetermined locations may include areas between pixels in an array of pixels formed on the substrate of the liquid crystal display, and the method may further include the step of forming post spacers from the overlap region. The method may include the step of patterning a dielectric layer to form pretilt structures on pixel electrodes formed on one of the first, second, and third color filter layers other than on the overlap region. The step of patterning a dielectric layer to form pretilt structures may include patterning at least one of trenches and ridges on the pixel electrodes.

A liquid crystal display device, in accordance with the present invention includes a first substrate having a color filter layer formed thereon,: and the color filter layer includes at least two color filter portions. Each color filter portion corresponds to a different color. A color filter stack is formed on the color filter layer, and the color filter stack includes the color filter layer and an overlapped portion of at one least other color filter portion. A dielectric material is formed on the overlapped portion to provide a gap structure between the first substrate and a second substrate to provide a gap distance for liquid crystal disposed between the first substrate and the second substrate.

In alternate embodiments, a conductive layer may be formed on the color filter layer to form at least one electrode. The dielectric material may include a pretilt structure formed on the at least one electrode. The pretilt structure may include one of a trench structure and a ridge structure. The device may further include a conductive layer formed on the second substrate to form at least one electrode. The dielectric material may include a pretilt structure formed on the at least one electrode. The pretilt structure may include one of a trench structure and a ridge structure. The gap structure may include at least one of a dam for sealing the liquid crystal in the gap and a post spacer for providing the gap distance. The at least two color filter portions may include three color filter portions and the overlapped portion of at one least other color filter portion may include an overlapped portion of the three color filter portions. The overlapped portion of the three color filters may be about one half the gap distance in thickness or the whole gap distance. The dielectric material may be about one half the gap distance in thickness.

Another liquid crystal display device, in accordance with the present invention, includes a first substrate having a color filter layer formed thereon. The color filter layer includes at least two color filter portions, and each color filter portion corresponds to a different color. A color filter stack is formed on the color filter layer, and the color filter stack includes the color filter layer and an overlapped portion of at least one other color filter portion. The overlapped portion has a thickness employed for forming at least one of a dam structure and a post spacer to provide a gap structure between the first substrate and a second substrate to provide a gap distance for liquid crystal disposed between the first substrate and the second substrate.

In alternate embodiments, the display device may include a conductive layer formed on the color filter layer to form at least one electrode. The device may further include a dielectric material patterned on the at least one electrode to form a pretilt structure. The pretilt structure may include one of a trench structure and a ridge structure.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1A:
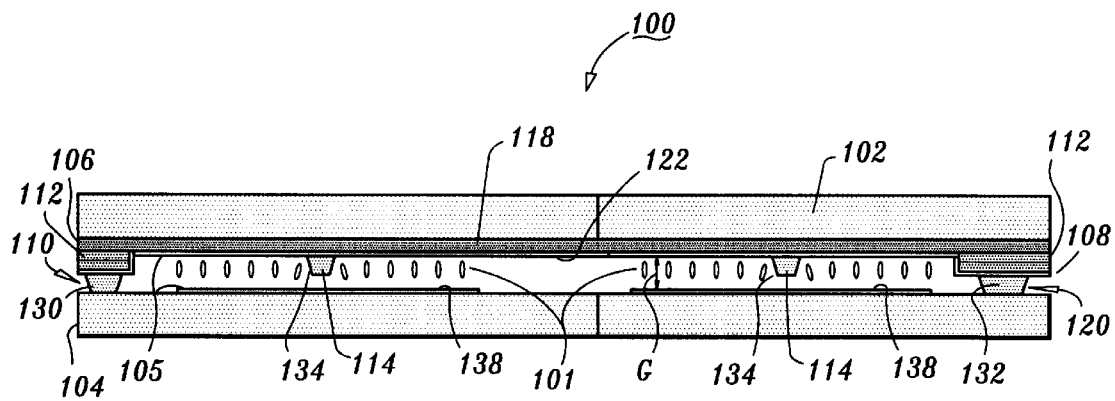
FIGS. 1A and 1B are cross-sectional views of a field off and a field on state, respectively, for a multi-domain vertically aligned liquid crystal display having color filter stacks and dams, spacer posts and pretilt structures (ridges) formed in a single lithographic process step in accordance with the present invention.

The present invention relates to liquid crystal displays, and more particularly to a display structure which provides improved performance and a method for fabricating pretilt structures, spacers and damns in a single lithographic step to decrease fabrication costs of the displays. The present invention achieves dual goals of improving display performance and saving manufacturing costs by building post spacers, dams and liquid crystal molecule pretilt structures (e.g., ridges or slits) in one photolithographic mask step.

In a liquid crystal display, liquid crystal material is sandwiched between two substrates with a gap (cell gap) existing therebetween. Front of screen (FOS) quality of a display is closely related to the accuracy of cell gap control. For conventional methods, spacer balls are used to control the cell gap of the LCD panel. The spacer balls are randomly sprayed on the surface of one substrate before the two substrates are assembled together. This method can control cell gap with the uncertainty in the range of ±0.5 $\mu$m. The random distribution of the spacer balls in the panel also causes light leakage in the dark state. This results in a reduction of contrast ratio of the LCD due to light leakage around the spacer balls in the dark state.

To improve this, the present invention eliminates spacer balls by employing post spacers. Post spacers are fabricated using, for example, polymer material which is the same as or similar to that of a color filter layer. A photolithographic process is used to build the post spacers away from pixel areas so that there are no spacers in the pixel area to cause light leakage in the dark state. Therefore, the contrast ratio of the LCD is much improved. In addition, the post spacers have better cell gap control, for example, two times more accurate than that of spacer balls. The post spacers can be built on the TFT (thin-film-transistor) substrate or on the color filter substrate, or both.

A glue seal is used to hold two substrates together and to confine liquid crystal material inside the glue seal pattern. Due to the possible interaction between the glue seal material and liquid crystal, the LCD panel may have FOS problems, such as white smearing, near the glue edge. Dam structures are preferably built around the inside edge of the glue area and outside of the display active area to prevent or reduce the FOS problems. The dam structure may be built in accordance with the invention using the same material as or similar to that of color filter with the same photolithographic process.

Conventional liquid crystal displays suffer from narrow viewing angles. A multi-domain vertical alignment method (MVA) can be used to improve the display viewing angle. An MVA structure is based on pretilt angle control using either a ridge, a slit or a combination of structures to form a fringe field. In accordance with the invention, the ridge structure may be built using the same material as or similar to that of color filter with the same photolithographic process. Therefore, by employing the present invention, a single lithographic process yields spacer posts, dam structures and pretilt structures and their associated advantages.

Figure 1B:
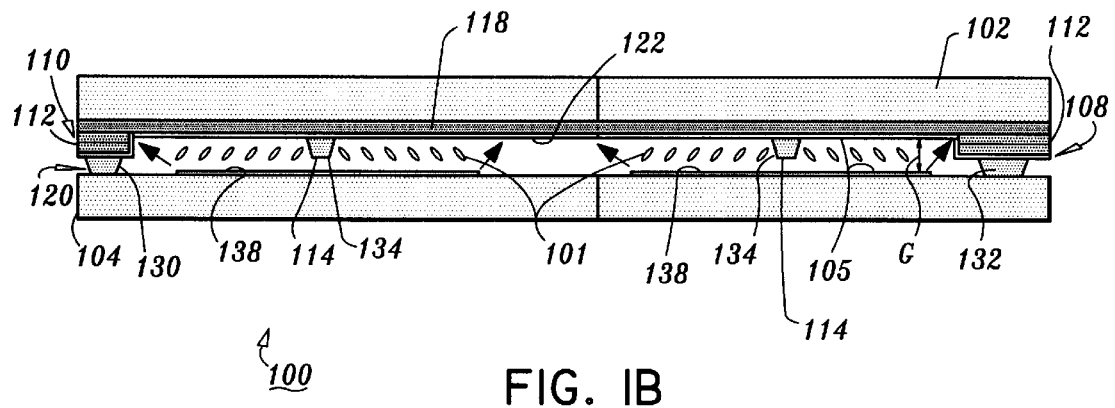

Referring now to the drawings in which like numerals represent the same or similar elements and initially to FIG. 1A, a cross-sectional view of a liquid crystal display device 100 is shown. The panel structures of FIGS. 1A and 1B include a multi-domain vertical alignment (VA) liquid crystal display. FIG. 1A shows an orientation of molecules of a liquid crystal material 101 in a field off (or low field) state, and FIG. 1B shows an orientation of molecules of liquid crystal material 101 in a field on (or high field) state. Device 100 includes a substrate 102 also known as a color filter substrate, and a substrate 104 also known as a transistor substrate or a thin film transistor (TFT) array substrate. Substrate 102 may include a black matrix layer (not shown) for reducing light leakage around pixels as is known in the art. A color filter layer 106 preferably includes three color filters (red, green and blue color filters). Each color filter includes is patterned in a separate photolithographic step.

Advantageously, the present invention exploits the need for three filters and three process steps by overlapping the color filters in strategic locations to form at least a portion of post spacers 108 and at least a portion of dams 110. In these areas, three color layers are overlapped to provide additional height on which dams 110 and post spacers 108 will be built. Color filter stacks 112 are formed by employing modified lithographic patterns to create the appropriate over lap of the color filter layers. A layer 118 is deposited over color filter layer 106 and color filter stacks 112 to form a transparent electrode 122. Layer 118 preferably includes a transparent conductor layer, such as, for example, indium tin oxide or indium zinc oxide.

Next dams 110, post spacers 108 and ridges 114 are built by depositing a layer 120 on layer 118 over color filter layer 106 and color filter stacks 112. Advantageously, layer 120 is patterned using a single photo mask and photolithographic step. Layer 120 preferably includes a dielectric material such as, for example, XP9595 available from Shipley, Inc., Optomer-NN500 commercially available from JSR, or CT-122, available from Fuji-Olin (layer 120 is transparent). When layer 120 is patterned, a portion 130 of dam 110, a portion 132 of post spacer 108 and pretilt structure 134 (in this case a ridge 114 is shown) are formed. In one embodiment, the thickness of layer 120 is about half of a cell gap (G) and color filter stacks 112 are formed such that the thickness of two the color filter layers is about half of the cell gap such that the sum of the two equals the cell gap distance (G).

Substrate 104 includes pixel electrodes 138, thin film transistors (not shown) and other display circuitry. The present invention may form portions of spacer posts, dams and/or pretilt structures on substrate 104 or form these structures on a combination of substrate 102 and substrate 104. Color filter substrate 102 and a corresponding TFT array substrate 104 are then coated with a vertical alignment layer 105, such as, for example, SE-1211 from Nissan Chemical, Inc., JALS688 from JSR Inc. or other dry deposition vertical alignment layers. Advantageously, no rubbing or other alignment treatment is needed. Substrates 102 and 104 are then assembled together using conventional LCD cell fabrication methods and preferably a negative dielectric anisotrpoic liquid crystal, such as, for example, MLL 2039 available from Merck, Inc. which is employed to fill gap (G) between the panels. As shown in FIG. 1, cell gap thickness (G) is controlled by the sum of thickness of two (or three) color filter layers of color filter stack 112 and post spacer 108. The thickness of the ridge of pretilt structure 134 is about half of the cell gap.

Figure 2:
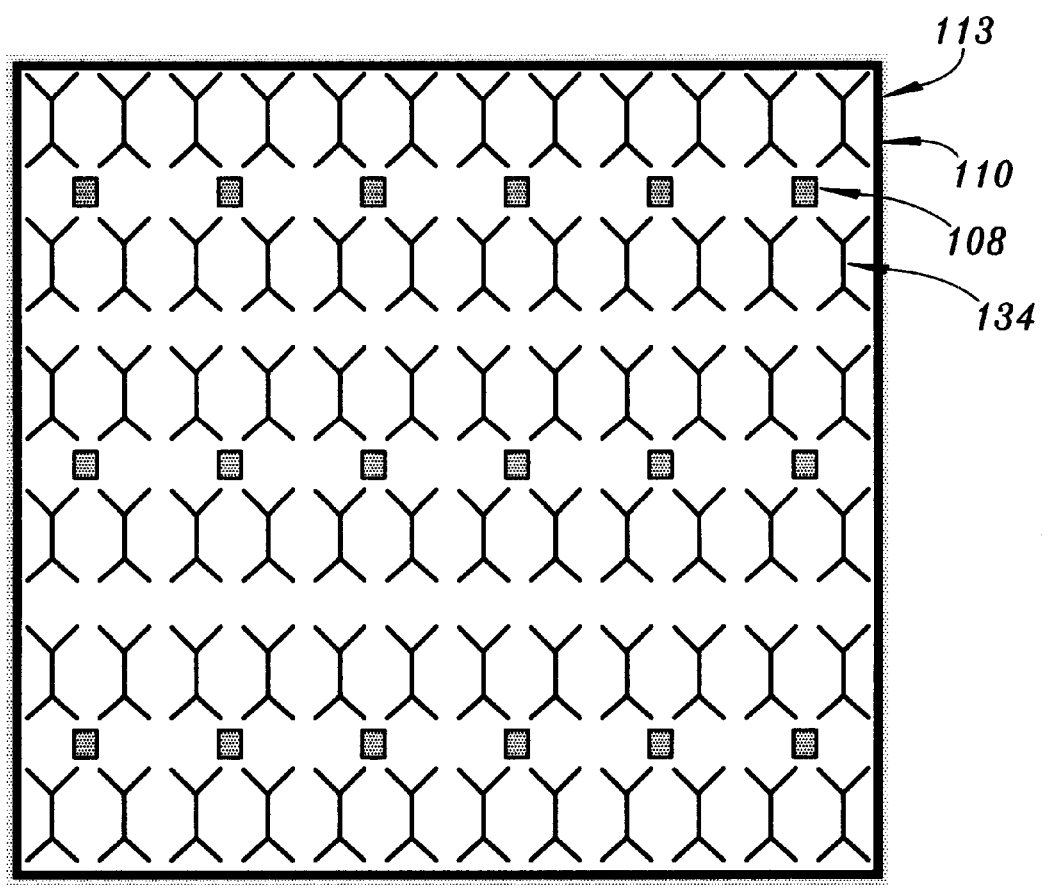
FIG. 2 is an illustrative pattern showing dams, spacers and pretilt structures formed in accordance with the present invention.
Figure 3:
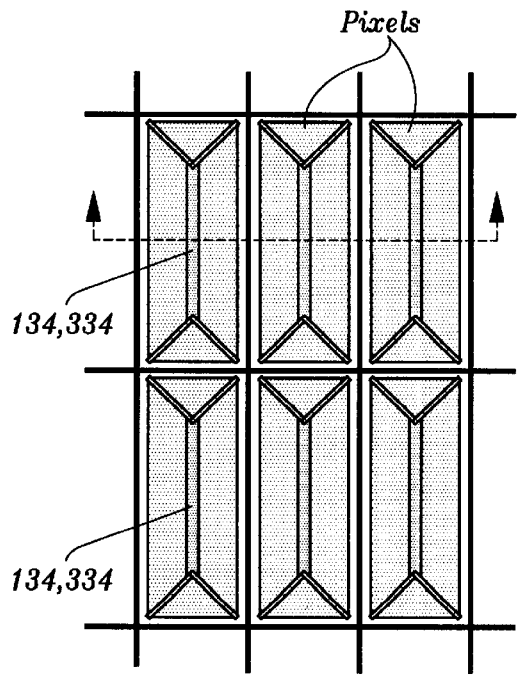
FIGS. 3–8 are top views of liquid crystal displays showing a plurality of pretilt structures for trenches/ridges in accordance with the present invention.
Figure 4:
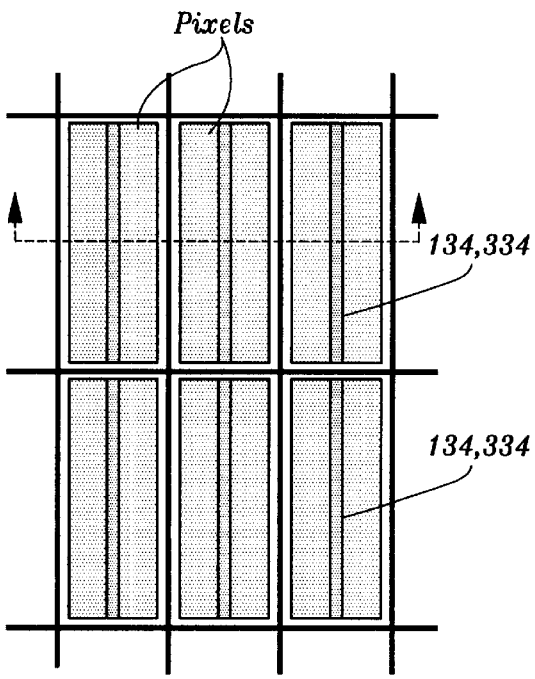
Figure 5:
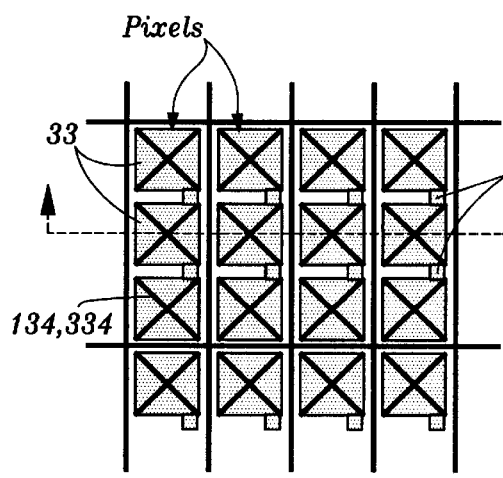
Figure 6:
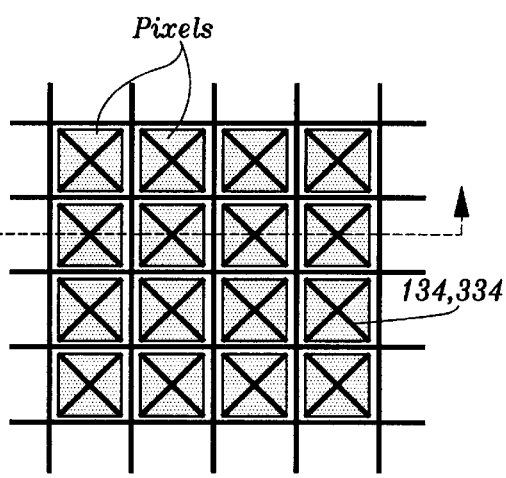
Figure 7:
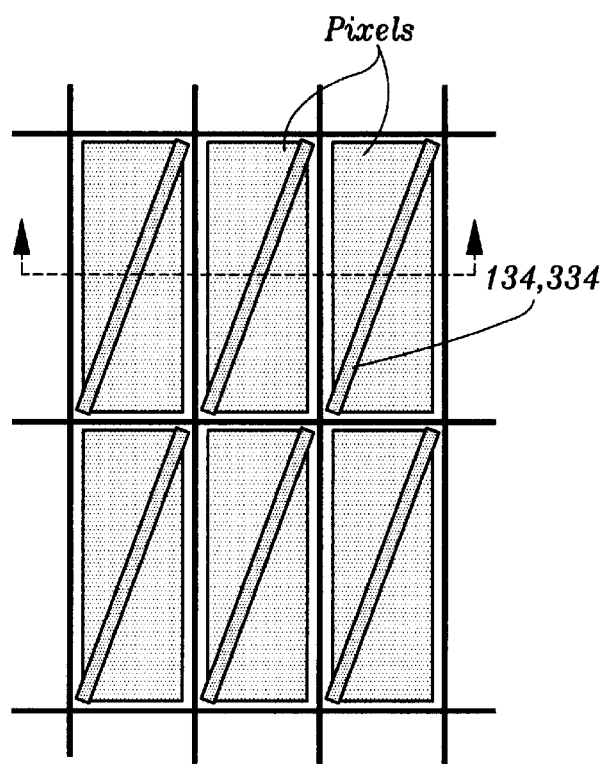
Figure 8:
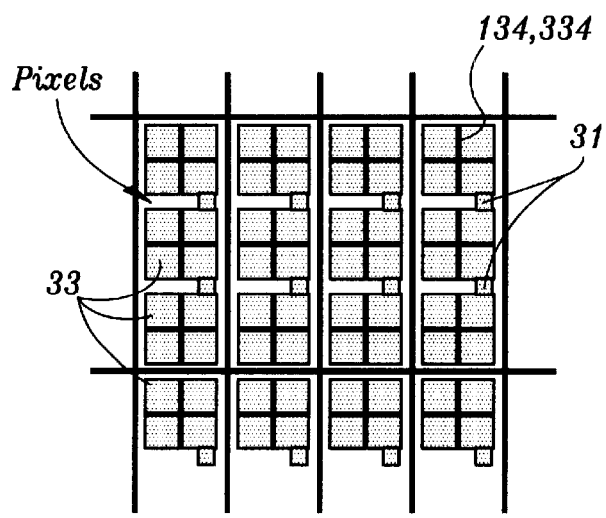

Referring to FIG. 2, a top view of an illustrative design of a pattern formed on a substrate is shown. Dam 110 is located next to a glue seal pattern 113 and is used to prevent glue interaction or contamination with liquid crystal, i.e. seal off the liquid crystal. Spacers 108 are used which include color filter stacks 112 to control the cell gap of the display panel. Y-inverse-Y ridges are pretilt control structures 134 for providing pretilt control to form multi-domains for each pixel in a display. Pretilt control structures 134 (and pixel edges) are used to control the tilting direction of liquid crystal molecules and to widen display viewing angles. Different ridge or trench structures may be employed. examples of these ridge or trench structures are given in FIGS. 3–8, and described in U.S. Pat. No. 5,907,380, to Lien and incorporated herein by reference. Other pretilt control structures are also contemplated. It should be noted in FIGS. 5 and 8 sub-pixels 33 are connected by conductors 31 to form pixels.

Figure 9A:
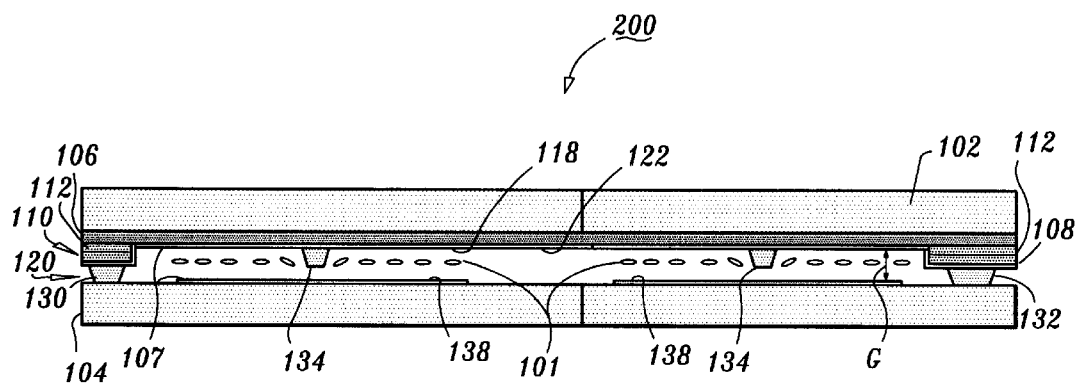
FIGS. 9A and 9B are cross-sectional views of a field off and a field on state, respectively, for a two-domain TN liquid crystal display having color filter stacks and dams, spacer posts and pretilt structures (ridges) formed in a single lithographic process step in accordance with the present invention.
Figure 9B:
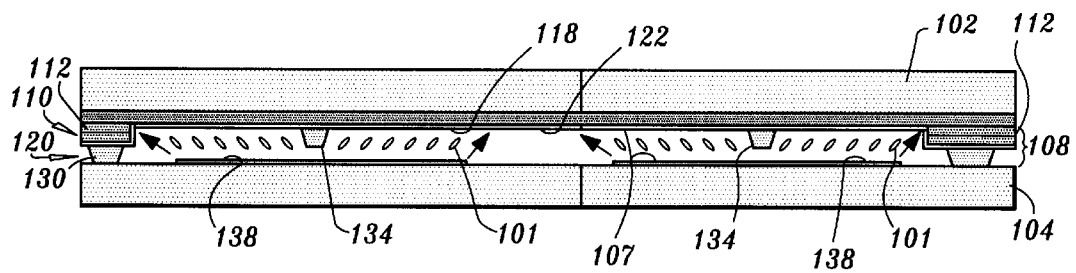

Referring to FIGS. 9A and 9B, a cross-sectional view of a liquid crystal display device 200 is shown. The panel cross-sectional structures of FIGS. 9A and 9B include a two-domain TN (twisted nematic) liquid crystal display. FIG. 9A shows an orientation of molecules of a liquid crystal material 101 in a field off (or low field) state, and FIG. 9B shows an orientation of molecules of liquid crystal material 101 in a field on (or high field) state.

The structure of FIGS. 9A and 9B is similar to that of FIGS. 1A and 1B; however a homogeneous (planar) alignment layer 107 with an almost zero pretilt angle is preferably employed. The almost zero pretilt homogenous alignment can be achieved by a polymer layer coating, similar to those described for layer 105 above, followed with polarizer UV alignment or by silicon oxide film coating followed by proper ion beam treatment. Again, pretilt structures (ridges) 134 in combination with fringe field from the pixel edge are used to control the tilting direction of liquid crystal molecules and to widen display viewing angles. Examples of the ridge or trench structures are given in FIGS. 3–8 and in U.S. Pat. No. 5,907,380. In the embodiments shown in FIGS. 1A, 1B and 9A, 9B, the color filter, post spacer, dam and ridges are built on the color filter substrate. These layers can also be built on the TFT array substrate as described below.

Figure 10A:
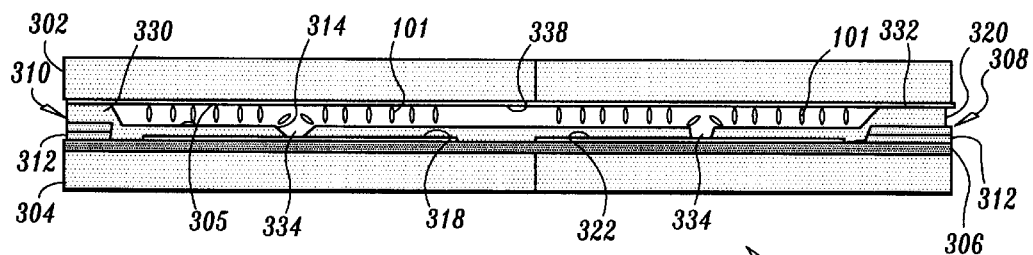
FIGS. 10A and 10B are cross-sectional views of a field off and a field on state, respectively, for a multi-domain vertically aligned liquid crystal display having color filter stacks and dams, spacer posts and pretilt structures (trenches) formed in a single lithographic process step in accordance with the present invention.
Figure 10B:
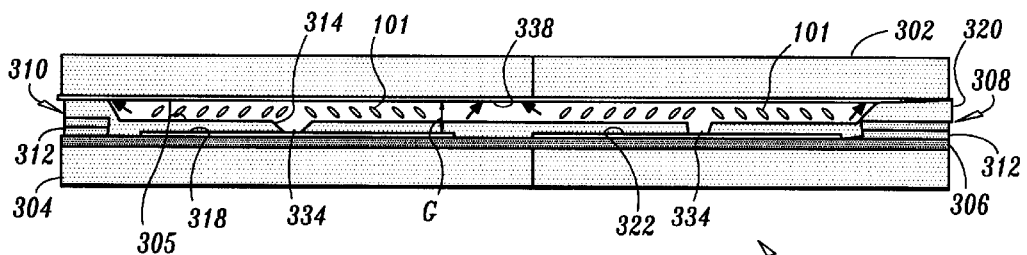

Referring to FIGS. 10A and 10B, pretilt structures 134 (ridges) are replaced by pretilt structures 334 in the form of slits, preferably in a polymer layer, on TFT array substrate 304 for device 300. As described above, a cell gap (G) is determined by the thickness of the sum of a color filter stack 312 and a layer 320.

A color filter layer 306 includes three color filters (red, green and blue color filters). Each color filter includes is patterned in a separate photolithophic step. Advantageously, the present invention exploits the need for three filters (although two or more layers can be overlapped) and three process steps by overlapping the color filters in strategic locations to form at least a portion of post spacers 308 and at least a portion of dams 310. In these areas, three color layers are overlapped to provide additional height on which dams 310 and post spacers 308 will be built. Color filter stacks 312 are formed by employing modified lithographic patterns to create the appropriate over lap of the color filter layers. A layer 318 is deposited over color filter layer 306 and patterned to form pixel electrodes 322. Layer 318 preferably includes a transparent conductor layer, such as, for example, indium tin oxide or indium zinc oxide.

Next dams 310, post spacers 308 and trenches 314 are built by depositing layer 320 on color filter layer 306 and color filter stacks 312. Advantageously, layer 320 is patterned using a single photo mask and photolithographic step. Layer 320 preferably includes a dielectric material such as, for example, XP9595 available from Shipley, Inc., Optomer-NN500 commercially available from JSR, or CT-122, available from Fuji-Olin. When layer 320 is patterned, a portion 330 of dam 310, a portion 332 of post spacer 308 and pretilt structure 334 (in this case a trench 314 is shown) are formed. In one embodiment, the thickness of layer 320 is about half of a cell gap (G) and color filter stacks 312 are formed such that the thickness of two the color filter layers is about half of the cell gap such that the sum of the two equals the cell gap distance (G). In other embodiments, the cell gap is maintained by two or more color filter layers which include a total thickness equal to the cell gap distance (G).

Substrate 302 includes a common transparent electrode 338, while substrate 304 includes thin film transistors (not shown) and other display circuitry. The present invention may form portions of spacer posts, dams and/or pretilt structures on substrate 304 or form these structures on a combination of substrate 302 and substrate 304. Substrate 302 and a substrate 304 are then coated with a vertical alignment layer 305, such as, for example, SE-1211 from Nissan Chemical, Inc., JALS688 from JSR Inc. or other dry deposition vertical alignment layers. Advantageously, no rubbing or other alignment treatment is needed. Substrates 102 and 104 are then assembled together using conventional LCD cell fabrication methods and preferably a negative dielectric anisotropic liquid crystal material, for example, MLL 2039, available from Merck, Inc., is used to fill gap G.

Layer 320 may include a polymer, such as, for example, XP9595 available from Shipley, Inc., Optomer-NN500 commercially available from JSR, or CT-122, available from Fuji-Olin. Pretilt structures 334 include the structures shown in FIGS. 3–8, and those described in U.S. Pat. No. 5,907,380 as slit or trench structures (i.e., slits instead of ridges).

The panel cross-sectional structures of FIGS. 10A and 10B include a multi-domain vertically aligned (MVA) liquid crystal display. FIG. 10A shows an orientation of molecules of a liquid crystal material 101 in a field off (or low field state, and FIG. 10B shows an orientation of molecules of liquid crystal material 101 in a field on (or high field) state. A black matrix layer is omitted for simplicity in FIGS. 10A–B and 11A–B.

Figure 11A:
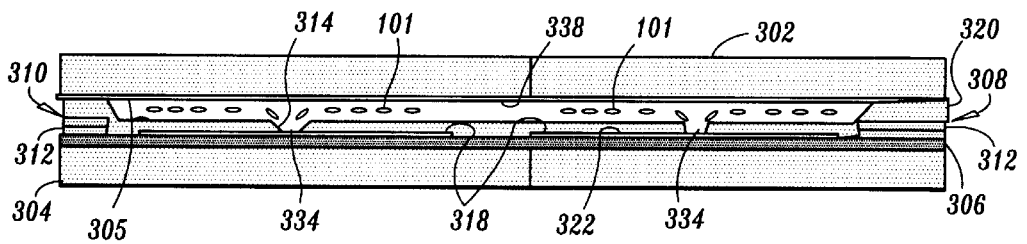
FIGS. 11A and 11B are cross-sectional views of a field off and a field on state, respectively, for a two-domain TN liquid crystal display having color filter stacks and dams, spacer posts and pretilt structures (trenches) formed in a single lithographic process step in accordance with the present invention.
Figure 11B:
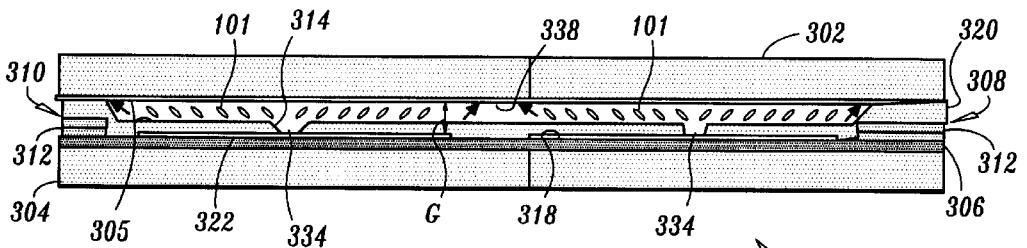

Referring to FIGS. 11A and 11B, a cross-sectional view of a liquid crystal display device 400 is shown. The panel cross-sectional structures of FIGS. 11A and 11B include a two-domain TN liquid crystal display. FIG. 11A shows an orientation of molecules of a liquid crystal material 101 in a field off (or low field) state, and FIG. 11B shows an orientation of molecules of liquid crystal material 101 in a field on (or high field) state.

Figure 12:
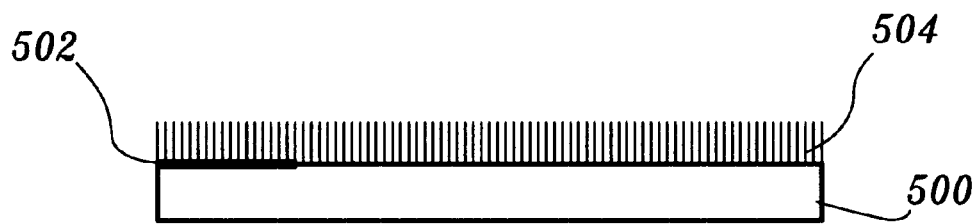
FIGS. 12–16 are cross-sectional view of a liquid crystal display showing method steps for forming color filter stacks and concurrently forming dams, spacers and pretilt structures in a single lithographic process step in accordance with the present invention.
Figure 13:
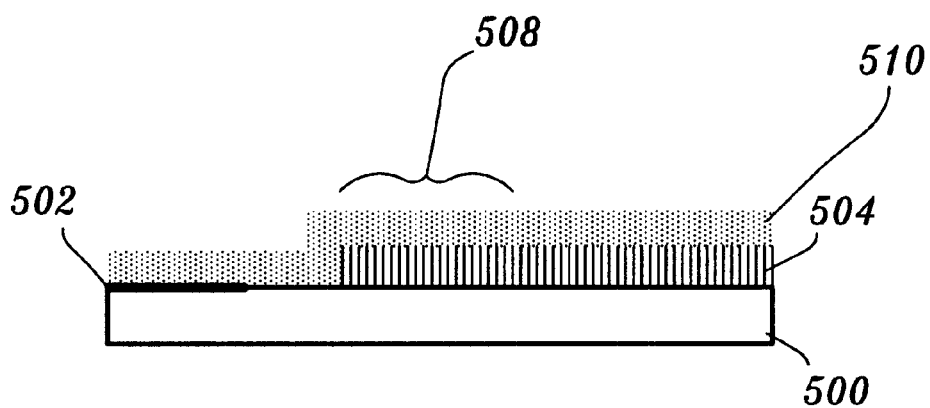

Referring to FIGS. 12–16, an illustrative method is shown for forming color stacks 112 (312) (FIGS. 1A–B, 9A–B or FIGS. 10A–B, 11A–B) in accordance with the present invention. In FIG. 12, a first color filter layer 504 is formed on a substrate 500 which may include a glass, plastic or quartz substrate. Substrate 500 may include a black matrix layer 502 or other layers as needed. First color filter layer 504 is deposited on substrate 500. In FIG. 13, color filter layer 504 is patterned to include an overlap region 508. A second color filter 510 is then deposited on color filter layer 504.

Figure 14:
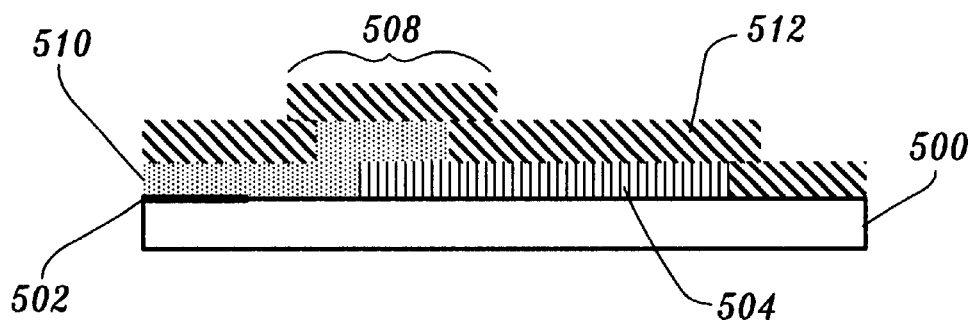
Figure 15:
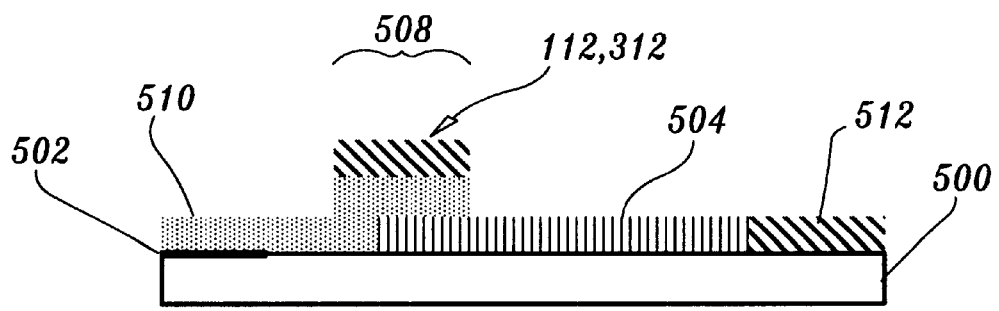
Figure 16:
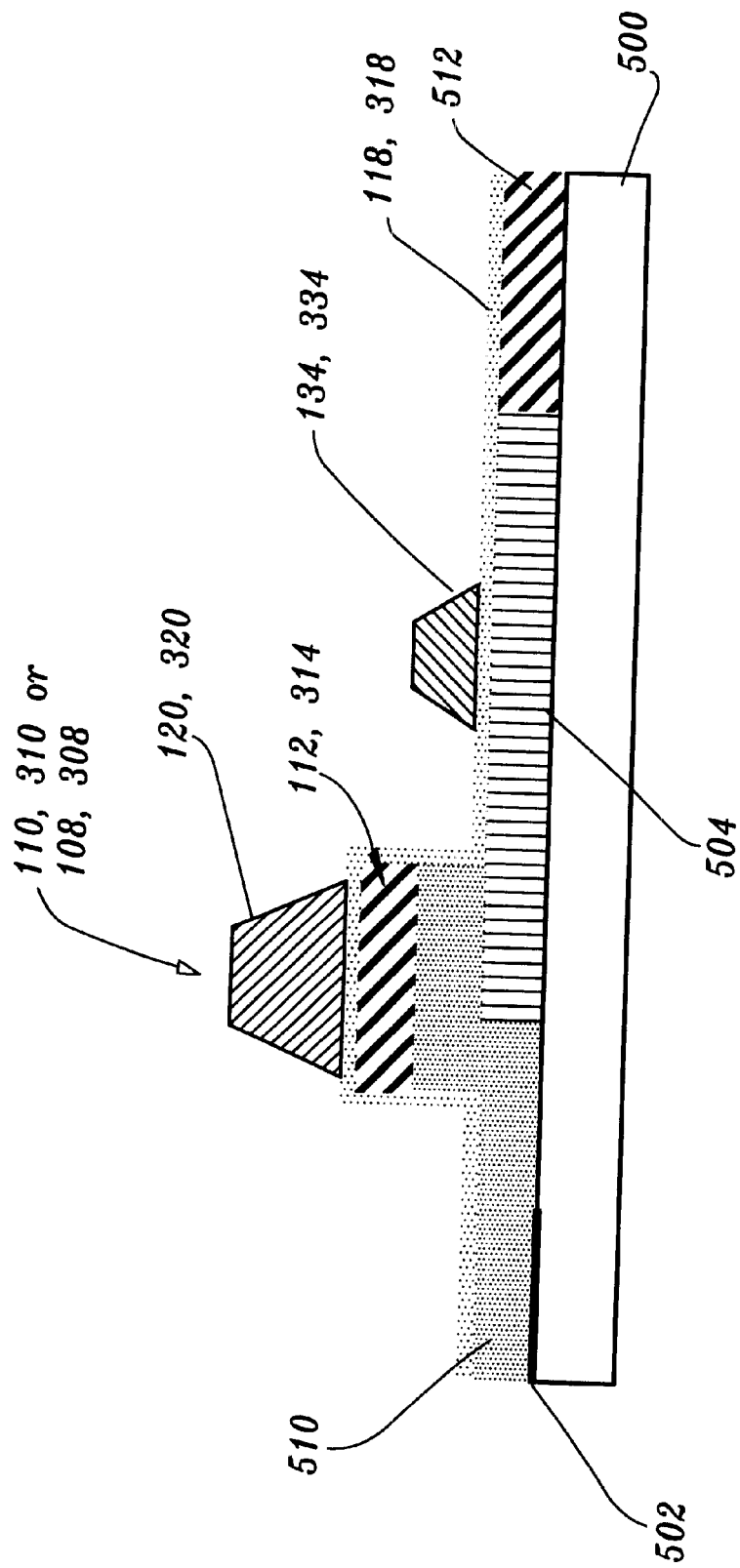

In FIG. 14, color filter layer 510 is patterned also providing overlap in overlap region 508. A third color filter layer 512 is then deposited. In FIG. 15, color filter layer 512 is patterned to form color filter stack 112 (or 312). In FIG. 16, a layer 120 (or 320) is then deposited after an electrode layer 118 (or 318) and dams 110 (or 310), spacer posts 108 (308) and pretilt structures 134 (or 334) (not shown) are formed as shown in FIGS. 1A–B and 10A–B, for example.

In this disclosure, we describe an efficient way to integrate post spacer, dam and ridge in the liquid crystal panel using one photolithographic mask. Thus, the dual goal of improving display performance and save the manufacturing coat at the same time is advantageously realized.

Figure 17:
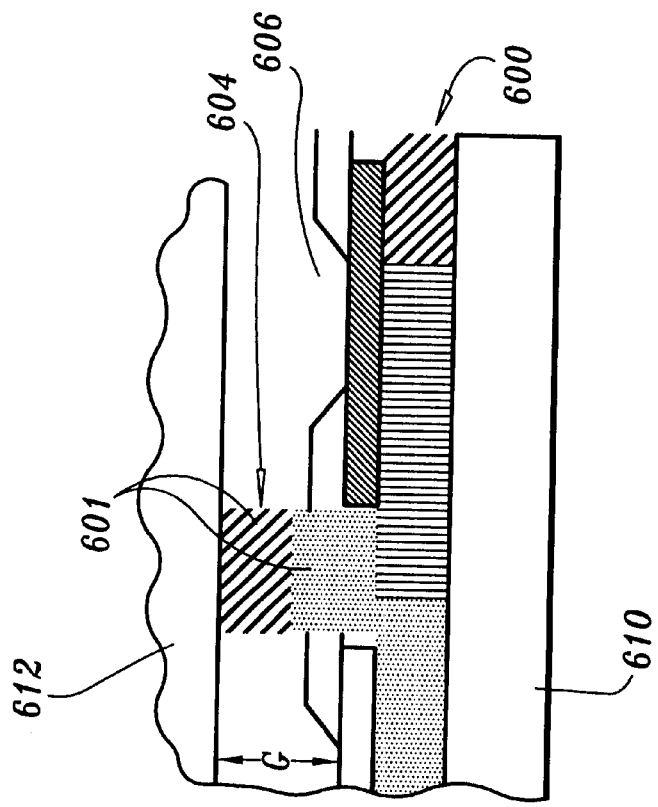
FIG. 17 is a cross-sectional view of a display device employing three color filter layers to provide a cell gap in accordance with the present invention.
Figure 17:
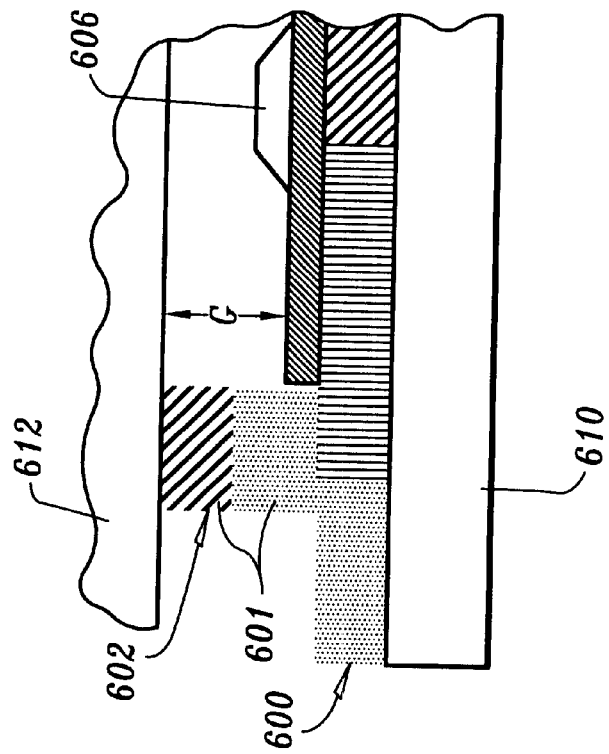

Referring to FIG. 17, although described in terms of fabricating dams, pretilt control structures and post spacers, the color filter overlapping of color filter layer 600 and portions 601 of color filters may be employed to form dams 602 and/or post spacers 604 by providing sufficient thickness of the layers. Dams 602 and post spacers 604 provide gap distance G between substrate 610 and 612. In one embodiment, pretilt control structures 606 may be formed by employing the dielectric layer as described above. In other embodiments, dams 602, spacers 604 or pretilt control structures 606 may be employed together or independently in accordance with the invention.

Having described preferred embodiments of wide viewing angle liquid crystal with ridge/slit pretilt control, post spacer and dam structures and method for fabricating same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for forming functional structures for a liquid crystal display comprising the steps of:
    providing a substrate;
    patterning a first color filter layer on the substrate;
    patterning a second color filter layer on the first color filter layer and the substrate such that the first color filter layer and the second color filter layer overlap at predetermined locations;
    patterning a third color filter layer on the second color filter layer and the substrate such that an overlap region exists between the first, second and third color filter layers at the predetermined locations, the overlap region including a thickness of the first, second and third color filter layers;

patterning a dielectric layer on the overlap region about a periphery of the display device to form the functional structures.

2. The method as recited in claim 1, wherein the functional structures includes dam structures formed on the overlap regions about the periphery of the display device.

3. The method as recited in claim 1, wherein the predetermined locations include areas between pixels in an array of pixels formed on the substrate of the display device.

4. The method as recited in claim 1, wherein the step of patterning a dielectric layer on the overlap region to form the functional structures includes the step of patterning pretilt structures on pixels electrodes formed on one of the first, second, and third color filter layers other than on the overlap region.

5. The method as recited in claim 4, wherein the step of patterning pretilt structures includes patterning at least one of trenches and ridges on the pixel electrodes.

6. The method as recited in claim 1, wherein the step of patterning a dielectric layer on the overlap region to form the functional structures includes the step of concurrently forming dams, post spacers and pretilt structures by patterning the dielectric layer be employing a single lithographic process.

7. A method for forming dams, post spacers and pretilt structures in a single lithographic step for a liquid crystal display comprising the steps of:

providing a first substrate and a second substrate, the second substrate having at least one electrode formed thereon;

patterning a first color filter layer on the first substrate;

patterning a second color filter layer on the first color filter layer and the first substrate such that the first color filter layer and the second color filter layer overlap at predetermined locations;

patterning a third color filter layer on the second color filter layer and the first substrate such that overlap regions exist between the first, second and third color filter layers at the predetermined locations, the overlap regions including a thickness of the first, second and third color filter layers;

forming at least one electrode on the first, the second and the third color filter layers of the first substrate other than on the overlap regions; and patterning a dielectric layer on the overlap regions and the at least one electrode on the first substrate to concurrently form the dams, the spacers posts on the overlap regions and the pretilt structures on regions other than the overlap regions.

8. The method as recited in claim 7, further comprising the step of assembling the first substrate and the second substrate together such that the post spacers provide a gap distance between the at least one electrode on the first substrate and the at least one electrode on the second substrate.

9. The method as recited in claim 7, further comprising the step of assembling the first substrate and the second substrate together such that the dams provide a seal to prevent leakage of liquid crystal material disposed between the first and second substrates.

10. The method as recited in claim 7, wherein the step of patterning a dielectric layer on the overlap regions includes the step of patterning pretilt structures which include a ridge or a trench.

11. The method as recited in claim 7, wherein the overlap region includes a thickness of about one half the gap distance.

12. The method as recited in claim 7, wherein the dielectric layer includes a thickness of about one half the gap distance.

13. A method for forming functional structures for a liquid crystal display comprising the steps of:

providing a substrate;

patterning a first color filter layer on the substrate;

patterning a second color filter layer on the first color filter layer and the substrate such that the first color filter layer and the second color filter layer overlap at predetermined locations;

patterning a third color filter layer on the second color filter layer and the substrate such that an overlap region exists between the first, second and third color filter layers at the predetermined locations, the overlap region including a thickness of the first, second and third color filter layers which is equal to a cell gap distance for the liquid crystal display;

patterning a dielectric layer to form pretilt structures on pixel electrodes formed on one of the first, second, and third color filter layers other than on the overlap region, wherein the pretilt structures include trenches on the pixel electrodes.

14. The method as recited in claim 13, further comprising the step of forming dam structure in a periphery of the liquid crystal display, between the overlap region and an edge.

15. The method as recited in claim 13, wherein the predetermined locations include areas between pixels in an array of pixels formed on the substrate of the liquid crystal display and further comprising the step of forming post spacers from the overlap region.

16. A liquid crystal display device comprising:

a first substrate having a color filter layer formed thereon, the color filter layer including at least two color filter portions, each color filter portion corresponding to a different color;

a color filter stack formed on the color filter layer, the color filter stack including the color filter layer and an overlapped portion of at least one other color filter portion;

a dielectric material formed on the overlapped portion to provide a gap structure between the first substrate and a second substrate to provide a gap distance for liquid crystal disposed between the first substrate and the second substrate; and a conductive layer formed on the color filter layer to form at least one electrode, wherein the dielectric material includes a pretilt structure formed on the at least one electrode, and wherein the pretilt structure includes one of a trench structure and a ridge structure.

17. The device as recited in claim 16, further comprising a conductive layer formed on the second substrate to form at least one electrode.

18. The device as recited in claim 17, wherein the dielectric material includes a pretilt structure formed on the at least one electrode on the second substrate.

19. The device as recited in claim 18, wherein the pretilt structure includes one of a trench structure and a ridge structure.

20. The device as recited in claim 16, wherein the gap structure includes at least one of a dam for sealing the liquid crystal in the gap and a post spacer for providing the gap distance.

21. The device as recited in claim 16, wherein the at least two color filter portions includes three color filter portions and the overlapped portion of at least one other color filter portion includes an overlapped portion of the three color filter portions.

22. The device as recited in claim 21, wherein the overlapped portion of the three color filters about one half the gap distance in thickness.

23. The device as recited in claim 21, wherein the dielectric material is about one half the gap distance in thickness.

24. A liquid crystal display device comprising:

a first substrate having a color filter layer formed thereon, the color filter layer including at least two color filter portions, each color filter portion corresponding to a different color;

a color filter stack formed on the color filter layer, the color filter stack including the color filter layer and an overlapped portion of at least one other color filter portion;

a conductive layer formed on the color filter layer to form at least one electrode; and a dielectric material patterned on the at least one electrode to form a pretilt structure;

wherein the overlapped portion having a thickness employed for forming at least one of a dam structure and a post spacer to provide a gap structure between the first substrate and a second substrate to provide a gap distance for liquid crystal disposed between the first substrate and the second substrate, and wherein there is a dam structure formed on the overlapped portion about a periphery region of the display device.

25. The device as recited in claim 24, wherein the pretilt structure includes one of a trench structure and a ridge structure.

* * * * *